United States Patent
Oh et al.

(10) Patent No.: US 7,032,852 B2
(45) Date of Patent: Apr. 25, 2006

(54) TAPE LOADING DEVICE FOR A TAPE RECORDER

(75) Inventors: Jeong-hyeob Oh, Anyang (KR); Hyeong-seok Choi, Suwon (KR); Young-ho Cho, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 10/679,390

(22) Filed: Oct. 7, 2003

(65) Prior Publication Data

US 2004/0079823 A1    Apr. 29, 2004

(30) Foreign Application Priority Data

Oct. 24, 2002  (KR) .................. 10-2002-0065236
Dec. 31, 2002  (KR) .................. 10-2002-0088237

(51) Int. Cl.
*G11B 23/087*   (2006.01)
*G11B 5/027*    (2006.01)

(52) U.S. Cl. .................. 242/338.4; 360/85; 360/95
(58) Field of Classification Search .............. 242/338, 242/338.4; 360/85, 92, 95, 96.5
See application file for complete search history.

(56) References Cited

U.S. PATENT DOCUMENTS

| | | | | |
|---|---|---|---|---|
| 4,476,504 A | * | 10/1984 | Georges | 360/93 |
| 4,491,885 A | * | 1/1985 | Morikawa et al. | 360/85 |
| 4,789,912 A | * | 12/1988 | Masuda et al. | 360/85 |
| 4,985,789 A | * | 1/1991 | Kodama et al. | 360/85 |
| 5,293,283 A | * | 3/1994 | Masuda et al. | 360/85 |
| 5,739,977 A | * | 4/1998 | Son et al. | 360/85 |
| 6,122,136 A | * | 9/2000 | Tomitaka | 360/85 |
| 2002/0036861 A1 | * | 3/2002 | Hisadomi | 360/85 |

* cited by examiner

*Primary Examiner*—William A. Rivera
(74) *Attorney, Agent, or Firm*—Roylance Abrams Berdo & Goodman LLP

(57) ABSTRACT

A magnetic tape loading device for a tape recorder comprising a pole base assembly which moves along a deck chassis and takes a magnetic tape from a tape cassette during a loading of the magnetic tape, a guide rail which is mounted on the deck chassis to guide a movement of the pole base assembly during loading/unloading of the magnetic tape, and a movement prevention unit which prevents a movement of the pole base assembly during loading/unloading of the magnetic tape, and when the loading of the magnetic tape is completed.

19 Claims, 6 Drawing Sheets

TAPE LOADING DEVICE FOR A TAPE RECORDER

CROSS-REFERENCE TO RELATED APPLICATIONS

This application claims the benefit of Korean Patent Application No. 2002-88237 filed Dec. 31, 2002 and Korean Patent Application No. 2002-65236 filed Oct. 24, 2002, in the Korean Intellectual Property Office, the disclosures of which are incorporated herein by reference.

BACKGROUND OF THE INVENTION

1. Field of the Invention

The present invention relates to a tape recorder such as a video tape recorder (VTR) and a camcorder, which records and reproduces data with respect to a magnetic tape running along a predetermined path defined in a deck, and more particularly, to a tape loading device for a tape recorder which takes magnetic tape from the tape cassette in loading to bring the magnetic tape to a close contact with a head drum.

2. Description of the Related Art

FIG. 1 shows a moving deck 100 which is generally employed in a camcorder, as an example of a moving deck used in a conventional tape recorder. Referring to FIG. 1, the moving deck 100 of the conventional tape recorder includes a main chassis 110, a sub chassis 120 and a tape loading device.

The main chassis 110 forms a bottom of the moving deck 100, on which various components such as a head drum 130, a loading motor 150 and a capstan motor 140 are mounted.

The sub chassis 120 is slidably mounted on the main chassis 110, and reciprocates along the main chassis 110 during loading/unloading of the magnetic tape.

When loading a magnetic tape (not shown), the tape loading device takes the magnetic tape from a tape cassette (not shown) which is inserted in the moving deck 100, brings the magnetic tape into close contact with the head drum 130 and guides the magnetic tape so that the magnetic tape can run in close contact with the head drum 130. The tape loading device includes a pole base assembly 160, and stationary and movable guide rails 181, 185.

The pole base assembly 160 is mounted on the moving deck 100 to be moved with the loading/unloading of the magnetic tape, and guides the magnetic tape so that the magnetic tape runs in close contact with the head drum 130. Generally, there are a pair of pole base assemblies 160 in the moving deck 100, each being moved by the pressing of a link member 268 (FIG. 3) which is moved in association with the loading motor 150.

The guide rails 181, 185 guide the movement of the pole base assembly 160. More specifically, the guide rails 181, 185 include a pair of stationary guide rails 181, provided to the main chassis 120, and a pair of movable guide rails 185, provided to the sub chassis 120. The stationary and movable guide rails 181, 185 are inter-locked with each other by the movement of the sub chassis 120 during the loading of the magnetic tape, to form a movement path for the pole base assembly 160.

In the conventional moving deck 100 as shown in FIG. 1, a head drum base 170, which is mounted on the main chassis 110 to secure the head drum 130 with respect to the main chassis 110, is integrally formed with the guide rails 181. The movable guide rails 185 are integrally formed with the sub chassis 120.

FIG. 2 shows another moving deck 200, more recently introduced, in which the head drum base 170 (FIG. 1) is omitted from the tape recorder for the purpose of compactness and light-weight of the product, and the head drum 130 is directly mounted on the main chassis 210. In this construction, the stationary guide rails 281 are formed by bending a portion of the main chassis 210. The sub-chassis 220, which requires less strength than the main chassis 210, is formed of a plate which is thinner than the main chassis 210. Accordingly, the stationary guide rails 281 become thicker than the movable guide rails 285. In this configuration as shown in FIG. 3, a stepped portion (t) is defined at the connecting part between the stationary and movable guide rails 281, 285. Accordingly, during the loading of the magnetic tape, the pole base assembly 260 is obstructed by the stepped portion (t) in its movement from the movable guide rails 285 toward the stationary guide rails 281.

With the completion of the loading of the magnetic tape, the pole base assembly 260 is moved by the tension of the magnetic tape running in the deck 200. In order to avoid the movement of the pole base assembly 260, the pole base assembly 260 is biased in the 'A' direction by the link member 268 even after the completion of the magnetic tape loading. As the pole base assembly 260 is urged by the link member 268 at the time that the loading of the magnetic tape is completed, a moment to pivot the pole base assembly 260 in the 'B' direction of FIG. 3, is generated.

The conventional deck 100 as shown in FIG. 1 employs a separate support 171 (FIG. 1) to prevent the movement of the pole base assembly 160 (FIG. 1) due to the tension of the magnetic tape and the moment as mentioned above. More specifically, the support 171 is formed on the head drum base 170 and supports the pole base assembly 160 by contact when the loading of the magnetic tape is completed. However, in the conventional deck 200 shown in FIG. 2, as the stationary guide rails 281 are formed by bending a part of the main chassis 210, the support 171 as shown in FIG. 1 is omitted. Accordingly, as shown in FIG. 3, movement of the pole base assembly 260 by the tension of the magnetic tape and the moment cannot be prevented in the deck 200 of FIG. 2, and as a result, the running of the magnetic tape cannot be guided stably.

Additionally, there is a movement gap G defined between the link member 268, and the guide rails 281, 285, to ensure that contact between the link member 268 and the guide rails 281, 285 does not occur during the movement of the pole base assembly 260, and the pole base assembly 260 can be moved smoothly. However, because one side of the pole base assembly 260 is pressed by the link member 268 to move, a moment to pivot the pole base assembly 260 about its center occurs, and as a result, the pole base assembly 260 is moved as much as the gap G allows.

SUMMARY OF THE INVENTION

In an effort to solve the problems as described above, it is an aspect of the present invention to provide a magnetic tape loading device for a tape recorder, which is improved in structure so that a pole base assembly can be guided stably and without undesirable movement when a magnetic tape is loaded/unloaded or when the loading/unloading of the magnetic tape is completed.

In an effort to accomplish the above aspect and/or other features of the present invention, a magnetic tape loading device for a tape recorder includes a pole base assembly, a guide rail, and a movement prevention unit. The pole base assembly moves along a deck chassis, taking a magnetic tape from a tape cassette during a loading of the magnetic tape. The guide rail is mounted on the deck chassis to guide a movement of the pole base assembly during loading/unloading of the magnetic tape. The movement prevention unit prevents movement of the pole base assembly during loading/unloading of the magnetic tape, and when the loading of the magnetic tape is completed.

The deck chassis includes a main chassis, and a sub chassis which is slid along the main chassis during loading/unloading of the magnetic tape. The guide rail includes a stationary guide rail and a movable guide rail mounted on the main chassis and the sub chassis, respectively. The stationary guide rail and the movable guide rail are interlocked with each other by the movement of the sub chassis.

The stationary guide rail and the movable guide rail are formed to have a different thickness. The movement prevention unit includes a thickness compensation means formed on one among the stationary guide rail and the movable guide rail that is relatively thinner than the other, to cause the connection part between the stationary guide rail and the movable guide rail to be level.

The thickness compensation means has a stepped portion which is formed by bending, at least once, a part of either the stationary guide rail or the movable guide rail, whichever is relatively thinner than the other, to a predetermined length.

The stepped portion has a length identical to a thickness difference between the stationary guide rail and the movable guide rail. The stationary guide rail is integrally formed with the main chassis, and has a thickness identical to that of the main chassis.

The stationary guide rail is formed by bending a part of the main chassis at least once. The movable guide rail is integrally formed with the sub chassis, and has a thickness identical to that of the sub chassis.

The stationary and the movable guide rail are integrally formed with the main chassis and the sub chassis, respectively, and have a thickness identical to that of the main chassis and the sub chassis, respectively. The sub chassis is formed to have a thickness smaller than that of the main chassis.

During loading/unloading of the magnetic tape, the pole base assembly is pressed, and thus moved by a link member which is connected to a side thereof. The movement prevention unit has a leveling means which restrains movement of the link member so that the link member can move the pole base assembly while maintaining a parallel relation with respect to the guide rail.

The leveling means has a first protrusion protruding from the guide rail to contact a leading end of the pole base assembly when the loading of the magnetic tape is completed. The leveling means has a second protrusion formed between the guide rail and the link member.

The second protrusion protrudes downward from the lower surface of the guide rail. The second protrusion is formed on a surface of the guide rail by embossing.

BRIEF DESCRIPTION OF THE DRAWINGS

The above objects and other features of the present invention will become more apparent by describing in detail a preferred embodiment thereof with reference to the attached drawings, in which.

DETAILED DESCRIPTION OF THE PREFERRED EMBODIMENTS

Figure 1:
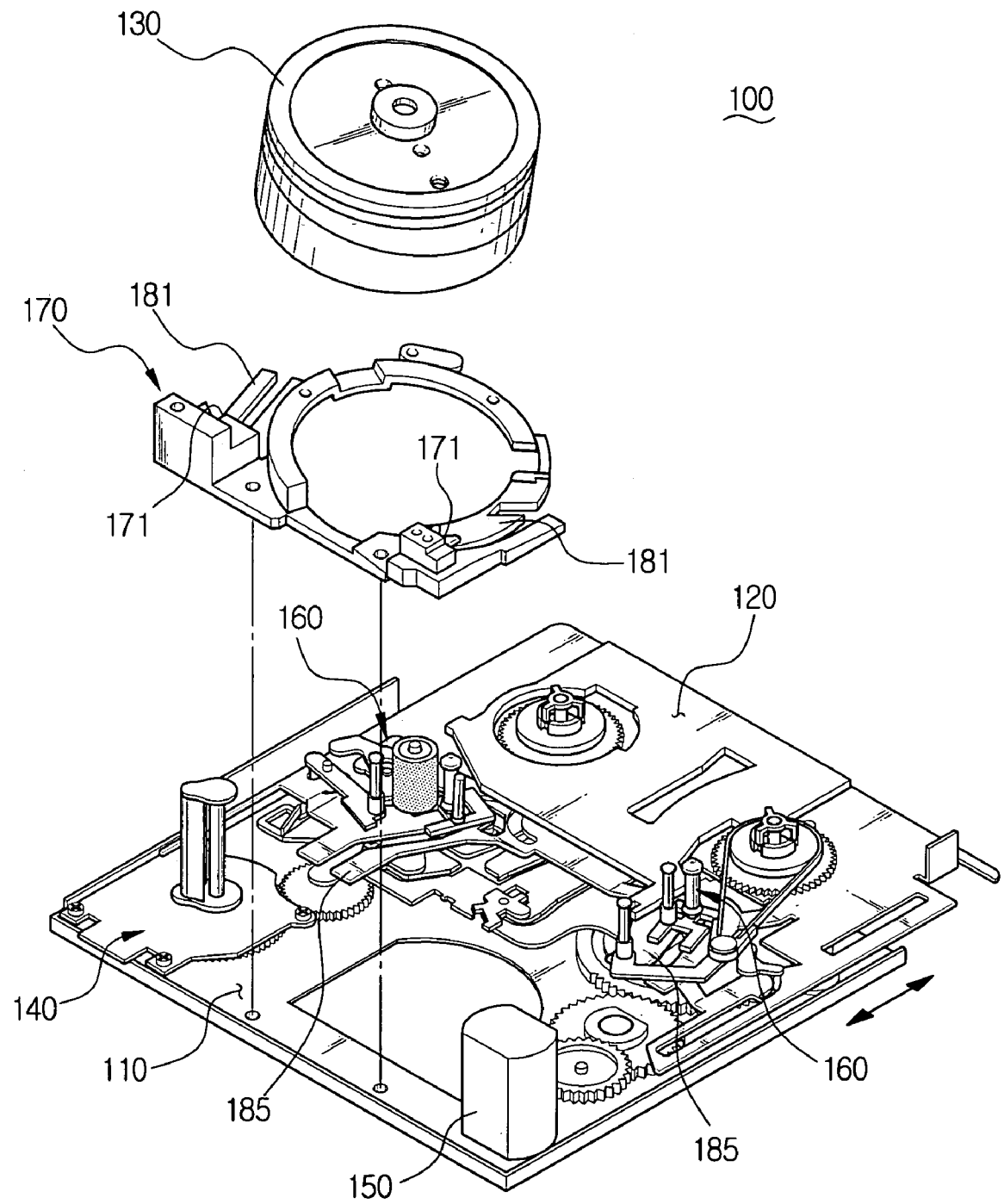
FIG. 1 is a perspective view illustrating the inner structure of a moving deck of a conventional tape recorder.
Figure 2:
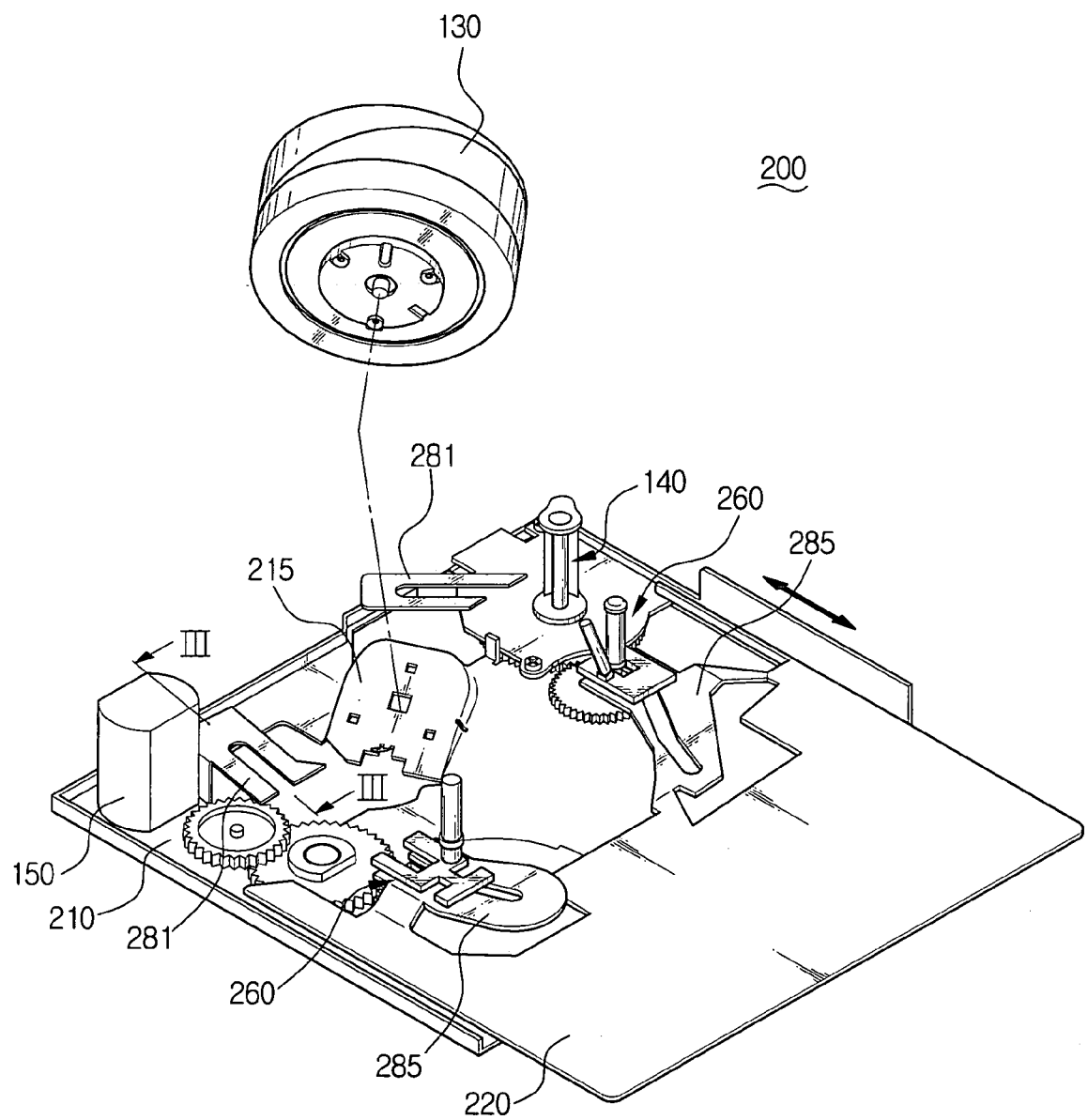
FIG. 2 is a perspective view illustrating the inner structure of another moving deck of a conventional tape recorder.

Hereinafter, certain embodiments of the present invention will be described in detail with reference to the accompanying drawings. Throughout the description, like elements having the same construction and function as those of the conventional tape recorder as described above with reference to FIGS. 1 to 3 will be referred to by the same reference numerals, and further description thereof will be omitted.

Figure 4:
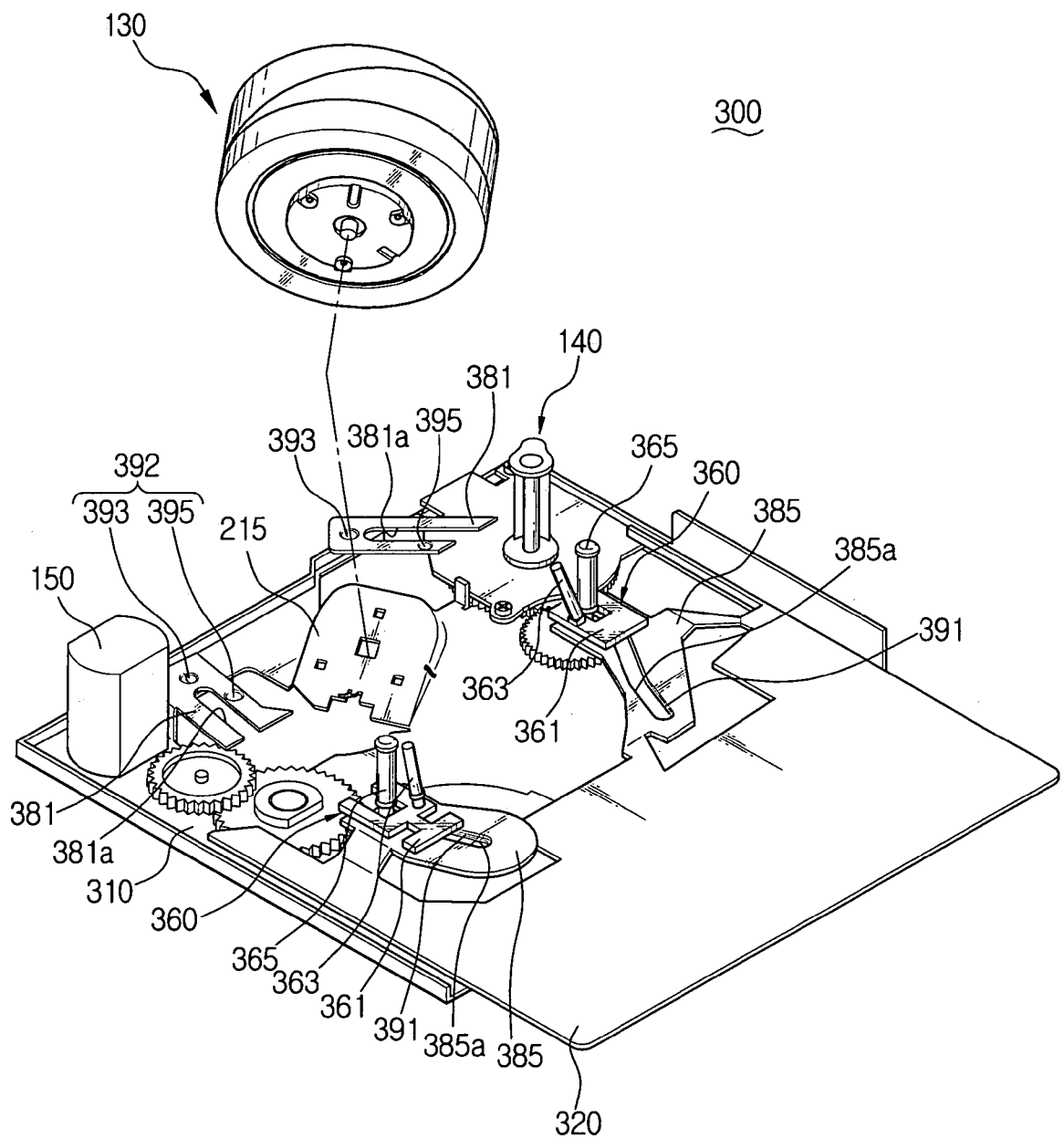
FIG. 4 is a perspective view illustrating the inner structure of a moving deck of a tape recorder according to a preferred embodiment of the present invention.
Figure 5:
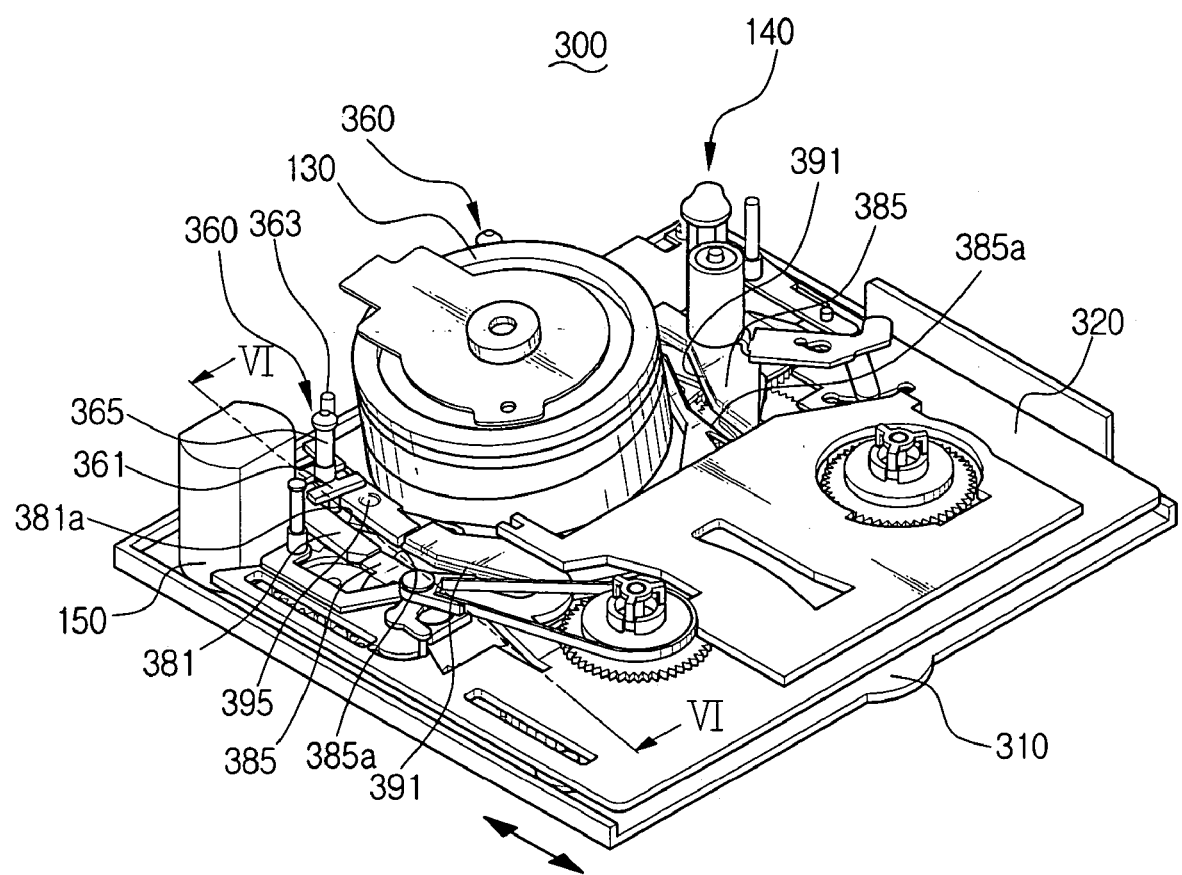
FIG. 5 is a perspective view illustrating in detail the inner structure of the moving deck with the pole base assembly of FIG. 5 being in loading position.

Referring to FIGS. 4 and 5, a tape loading device of a moving deck 300 of a tape recorder according to one preferred embodiment of the present invention includes a main chassis 310, a sub chassis 320, a pole base assembly 360, stationary and movable guide rails 381, 385, and movement prevention units 391, 392. The movement prevention units 391, 392 prevent movement of the pole base assembly 360 when the magnetic tape is loaded/unloaded or when the loading/unloading of the magnetic tape is completed, and this function of the movement prevention units 391, 392 will be described in greater detail below.

The main chassis 310 forms a bottom surface of the moving deck 300, and the head drum 130 is mounted thereon. The stationary guide rails 381 are integrally formed with a head drum seating potion 215. The head drum seating portion 215 is where the head drum 130 is seated, and is formed by bending a part of the bottom surface of the main chassis 310 to a predetermined angle. The construction and functions of the stationary guide rails 381 will be described in greater detail below.

The sub chassis 320 is slidably mounted on the main chassis 310, and reciprocates with the loading/unloading of the magnetic tape (not shown) to move back and forth with respect to the head drum 130 along the main chassis 310.

Figure 6:
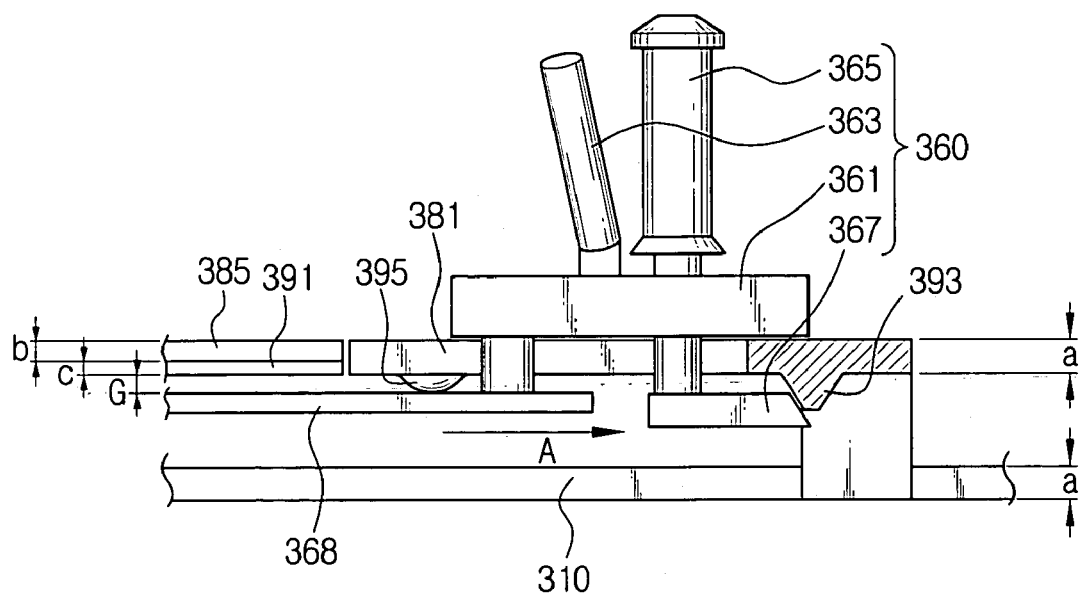
FIG. 6 is a sectional view taken on line VI—VI, illustrating the magnetic tape when loading is completed.

To make the tape recorder as compact as possible, the main chassis 310 and the sub chassis 320 are formed to have different thicknesses, respectively. The main chassis 310, is formed to have a predetermined sufficient thickness to ensure a predetermined sufficient amount of strength to protect the internal parts of the moving deck 300. Conversely, the sub chassis 320, which is moved along the main chassis 310, is formed to have a thickness as small as possible so that the tape recorder can be light-weight. In the embodiment of the present invention, as shown in FIG. 6, the main chassis 310 has a thickness (a) of or about 1 mm, and the sub chassis 320 has a thickness (b) of or about 0.6 mm, to satisfy the conditions discussed above. The main chassis 310 is formed of a metal plate, and the sub chassis 320 is preferably formed of an aluminum plate.

The pole base assembly 360 is moved along the moving deck 300, taking a magnetic tape from a tape cassette (not shown) and winding the magnetic tape approximately as much as a half of the outer circumference of the head drum 130. With the completion of the magnetic tape loading, the pole base assembly 360 is secured at a loading position so that the magnetic tape can run in a close contact with the head drum 130. There is a pair of pole base assemblies 360 mounted on the moving deck 300, facing both sides of the head drum 130. The pair of pole base assemblies 360 each has a base member 361 moving on the moving deck 300, at least one pole member 363 protruding from the upper surface of the base member 361 and/or a roller member 365. The pole base assembly 360 also includes a sub base 367 (FIG. 6) formed on the lower surface of the base member 361. When the loading of the magnetic tape is completed, the leading end of the sub base 367 is contacted with a first protrusion 393 which will be described in greater detail below. Reference numeral 368 denotes a link member moved by the loading motor 150 to move the base member 361. In order to ensure smooth movement of the pole base assembly 360, the link member 368 is spaced apart from the lower surface of the stationary and movable guide rails 381, 385 by a predetermined gap G.

The stationary and movable guide rails 381, 385 guide the pole base assembly 360 when the pole base assembly 360 is moved in accordance with the loading/unloading of the magnetic tape. There is a pair of the stationary guide rails 381 and a pair of the movable guide rails 385, each pair being formed on the main chassis 310 and the sub chassis 320. The stationary guide rails 381 and the movable guide rails 385 are connectable and dis-connectable in accordance with the movement of the sub chassis 320 along the main chassis 310 in accordance with the loading/unloading of the magnetic tape. At approximately the center of the stationary guide rail 381 and the movable guide rail 385, first and second guide grooves 381a, 385a (FIG. 5) are formed for the sliding movement of the base member 361 therealong.

The stationary guide rails 381 are each formed by cutting a part of the main chassis 310 and bending the cut part upwardly at least once. Accordingly, the stationary guide rail 381 is formed in the same thickness as that of the main chassis 310. In this case, a gap between the lower surface of the stationary guide rail 381 and the bottom surface of the main chassis 310 is sized such that the magnetic tape can be closely contacted with the head drum 130 by the pole member 363 of the pole base assembly 360 moving toward the head drum 130 and/or the roller member 365.

The movable guide rail 385 is integrally formed with the sub chassis 320 in the same thickness as that of the sub chassis 320.

Figure 3:
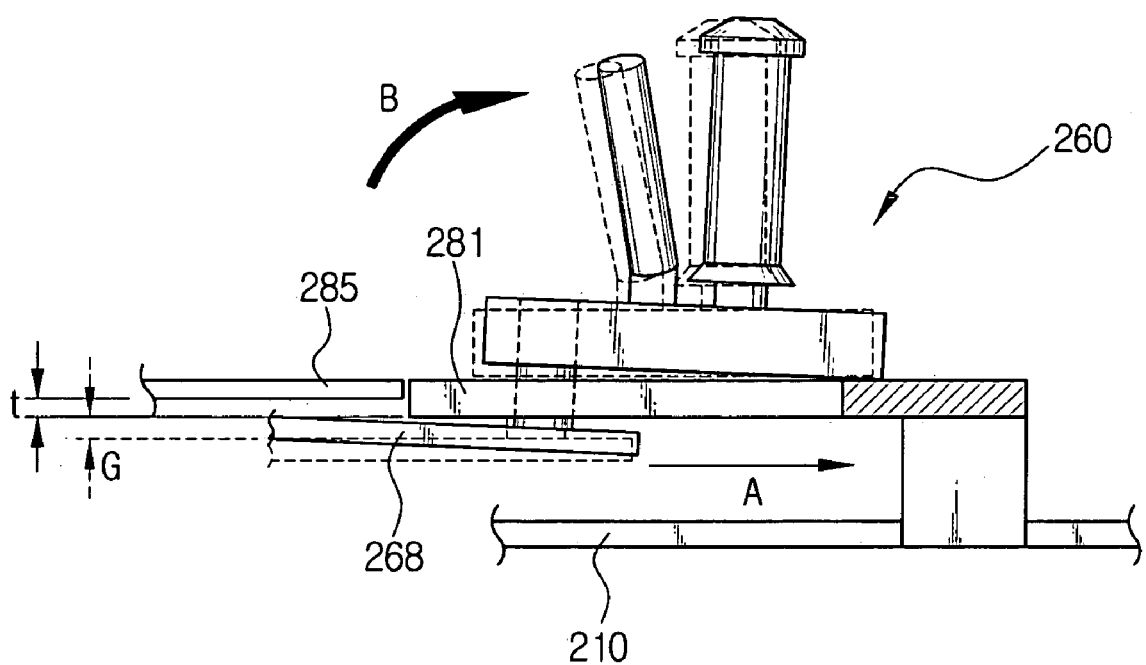
FIG. 3 is a sectional view taken on line III—III of FIG. 2, illustrating the stationary and movable guide rails being connected with each other.

According to the construction as described above, the stationary guide rail 381 is formed thicker than the movable guide rail 385. Accordingly, when the stationary guide rails 381 and the movable guide rails 385 are connected to form a movement path for the pole base assembly 360 during the loading of the magnetic tape, a stepped portion (t; FIG. 3) as thick as the thickness difference between the stationary and the movable guide rails 381, 385 is formed at the connecting part. In the embodiment of present invention where the main chassis 310 is formed in the thickness (a) of or about 1 mm, and the sub chassis 320 is formed in the thickness (b) of or about 0.6 mm, the thickness of the stepped portion (t) at the connecting part between the stationary and the movable guide rails 381, 385 is formed at or about 0.4 mm.

In order to make up for the hindrance to the movement of the pole base assembly 360 due to the presence of the stepped portion (t) at the connection part between the stationary and the movable guide rails 381, 385, the movement prevention unit of the tape loading device according to an embodiment of the present invention further includes a thickness compensation means. According to an embodiment of the present embodiment, the thickness compensation means includes an extended portion protruding downward from either the stationary guide rail 381 or the movable guide rail 385, whichever is thinner than the other. The thickness compensation means protrudes downward from the movable guide rail 385.

Figure 7:
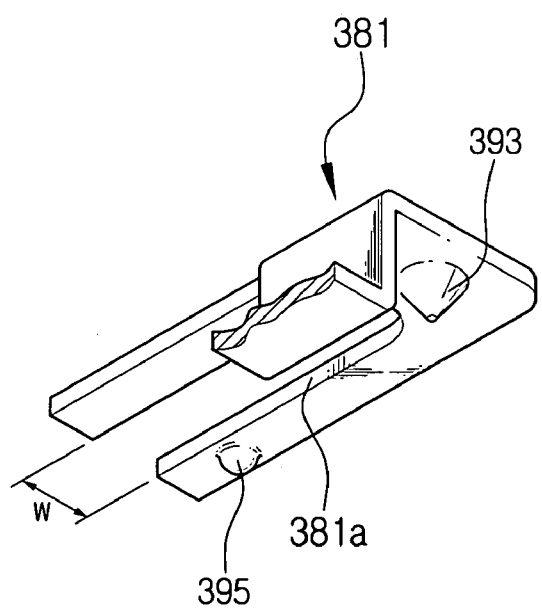
FIG. 7 is a perspective view illustrating the outer structure of the stationary guide rails.

Movement prevention unit (extended portion) 391 is formed by bending and extending a side of the movable guide rail 385, i.e., bending and extending an inner rim of the second guide groove 385a downward at least once. Here, the distance (c) between the lower surface of the extended portion 391 and the lower surface of the movable guide rail 385 is same as the thickness of the stepped portion (t, FIG. 3) between the stationary and the movable guide rails 381, 385. According to an embodiment of the present invention, as shown in FIG. 6, the distance (c) between the lower surface of the extended portion 391 and the lower surface of the movable guide rail 385 is at or about 0.4 mm. The distance between the opposite sides of extended portion 391 of the movable guide rail 385 is substantially identical to the width (w, FIG. 7) of the first guide groove 381a. In order to ensure a space for the extended portion 391, the second guide groove 385a is formed narrower than the width (w) of the first guide groove 381a.

When the extended portion 391 is formed as described above, the pole base assembly 360 can be moved smoothly along the connecting part between the stationary and the movable guide rails 381, 385 during the loading of the magnetic tape. In the embodiment of the present invention described above, the extended portion 391 protrudes downward from the lower surface of the movable guide rail 385. However, this should not be considered as limiting. Albeit not shown, if a distance from the bottom surface of the main chassis 310 to the lower surface of the movable guide rail 385 is identical to a distance from the bottom surface of the main chassis 310 to the lower surface of the stationary guide rail 381, the extended portion 391 protrudes upwardly of the movable guide rail 385. Further, albeit not shown, if the movable guide rail 385 is formed thicker than the stationary guide rail 381, it is possible that the extended portion 391 is formed on the stationary guide rail 381.

According to the preferred embodiment of the present invention, the movement prevention unit for the tape loading device (which can also be referred to as leveling means 392 (FIG. 4)), prevents undesired movement due to the link member 368 and the magnetic tape when the loading of the magnetic tape is completed. In this embodiment of the present invention, the leveling means 392 includes first and second protrusions 393, 395 (See FIG. 7).

The first protrusion 393 contacts the pole base assembly 360 instead of the support 171 (FIG. 1) when loading of the magnetic tape is completed. The first protrusion 393 protrudes downward from the stationary guide rail 381 to contact with the leading end of the sub base 367. Also, it is preferable that the first protrusion 393 is integrally formed with the stationary guide rail 381. For example, the first protrusion 393 may be formed at the time of processing the pressing for the main chassis 310 so as to be formed together with the stationary guide rail 381 by the embossing.

The second protrusion 395 restricts movement of the pole base assembly 360 in the 'B' direction (FIG. 3) by maintaining a movement gap (G, FIG. 6) between the link member 368 and the stationary guide rail 381 during the loading/unloading of the magnetic tape, or when the loading/unloading of the magnetic tape is completed. More specifically, when the loading of the magnetic tape is completed, the second protrusion 395 restrains the pole base assembly 360 from moving upwardly when the pole base assembly 360 is at the loading position. The second protrusion 395 protrudes from the upper surface of the link member 368, or from the lower surface of the guide rails 381, 385. In the latter case, the second protrusion protrudes from the lower surface of either the stationary guide rail 381 or the movable guide rail 385, whichever is opposed to the upper surface of the link member 368 when the loading of the tape is completed. Preferably, the height of the second protrusion 395 is identical to that of the movement gap (G). In an embodiment of the present invention, the second protrusion 395 is formed on the lower surface of the stationary guide rail 381 by the embossing. The second protrusion 395 can be formed together with the stationary guide rail 381 at the time of processing the pressing for the main chassis 310. Additionally, the second protrusion 395 can be formed by many alternative methods, and have various shapes, too.

It should be noted that the second protrusion 395 is not limited to the above description. The second protrusion 395 can be applied to the case where a predetermined movement gap (G) has to be defined between the link member 368 and the guide rails 381, 385 to prevent the contact of the link member 368 and the guide rails 381, 385 during the movement of the pole base assembly 360. Accordingly, because the movement gap (G) between the link member 368 and the guide rails 381, 385 is maintained at a substantially constant distance even in the movement of the pole base assembly 360, unwanted movement of the pole base assembly 360 is prevented.

Although certain embodiments of the present invention have been described in association with the camcorder, it should be noted that these embodiments of the present invention can also be applied to a tape recorder such as a video tape recorder (VTR) and a digital audio tape (DAT), both of which have a moving deck mechanism.

According to the various embodiments of the present invention as described above, formation of the stepped portion (t, FIG. 3) on the connection part between the stationary and the movable guide rails 381, 385 due to different thickness is restrained, and undesirable movement of the pole base assembly 360 after the loading of the magnetic tape can also be restrained.

As a result, the pole base assembly 360 moves stably during the loading of the magnetic tape, and after the loading of the magnetic tape is completed, running of the magnetic tape can be maintained stably.

Particularly, in the case that the stationary and the movable guide rails 381, 385 are integrally formed on the main chassis 310 and the sub chassis 320, respectively, the thickness of the sub chassis 320 can be thinner, and as a result, the tape recorder can also be made more compact. Also, because there is no need to proportionally size the main chassis 310 with respect to the relatively thinner sub chassis 320, durability of the tape recorder against the external impact is substantially guaranteed.

Although a few preferred embodiments of the present invention has been described, it will be understood by those skilled in the art that the present invention should not be limited to the described preferred embodiments, but various changes and modifications can be made within the spirit and scope of the present invention as defined by the appended claims.

What is claimed is:

1. A magnetic tape loading device for a tape recorder, comprising:
    a deck chassis comprising a main chassis and a sub chassis that slides along the main chassis during loading and unloading of the magnetic tape;
    a pole base assembly moving along the deck chassis to take a magnetic tape from a tape cassette during a loading of the magnetic tape;
    a stationary guide rail mounted on the main chassis;
    a movable guide rail mounted on the sub chassis, the stationary guide rail and movable guide rail guiding a movement of the pole base assembly during loading/unloading of the magnetic tape and having different thicknesses; and
    a thickness compensation means formed on either the stationary guide rail or the movable guide rail, whichever is relatively thinner than the other, to cause the connection part between the stationary guide rail and the movable guide rail to be level.

2. The magnetic tape loading device of claim 1, wherein the thickness compensation means comprises an extended portion which is formed by bending and extending at least once, a part of either the stationary guide rail or the movable guide rail, whichever is relatively thinner than the other, to a predetermined length.

3. The magnetic tape loading device of claim 2, wherein the extended portion has a length identical to a thickness difference between the stationary guide rail and the movable guide rail.

4. The magnetic tape loading device of claim 2, wherein the stationary guide rail is integrally formed with the main chassis, and has a thickness identical to that of the main chassis.

5. The magnetic tape loading device of claim 4, wherein the stationary guide rail is formed by bending a part of the main chassis at least once.

6. The magnetic tape loading device of claim 2, wherein the movable guide rail is integrally formed with the sub chassis, and has a thickness identical to that of the sub chassis.

7. The magnetic tape loading device of claim 2, wherein the stationary and the movable guide rails are integrally formed with the main chassis and the sub chassis, respectively, and have a thickness identical to that of the main chassis and the sub chassis, respectively.

8. The magnetic tape loading device of claim 7, wherein the sub chassis is formed to have a thickness smaller than that of the main chassis.

9. The magnetic tape loading device of claim 1, wherein, during loading/unloading of the magnetic tape, the pole base assembly is pressed, and thus moved by a link member which is connected to a side thereof.

10. A magnetic tape loading device comprising,
    a pole base assembly moving along a deck chassis to take a magnetic tape from a tape cassette during a loading of the magnetic tape;
    a link member connected to a side of the pole base assembly, the link member pressing the pole assembly during loading/unloading of the magnetic tape;
    a guide rail mounted on the deck chassis to guide a movement of the pole base assembly during loading/unloading of the magnetic tape; and
    a leveling means for restraining a movement of the link member so that the link member can maintain a parallel relation with respect to bottom surface of the guide rail during loading/unloading of the magnetic tape, and when the loading of the magnetic tape is completed.

11. The magnetic tape loading device of claim 10, wherein the leveling means comprises a first protrusion protruding from the guide rail to contact with a leading end of the pole base assembly when the loading of the magnetic tape is completed.

12. The magnetic tape loading device of claim 10, wherein the leveling means comprises a second protrusion formed between the guide rail and the link member.

13. The magnetic tape loading device of claim 12, wherein the second protrusion protrudes downward from the lower surface of the guide rail.

14. The magnetic tape loading device of claim 13, wherein the second protrusion is formed on a surface of the guide rail by embossing.

15. The magnetic tape loading device of claim 13, wherein the deck chassis comprises a main chassis, and a sub chassis slid along the main chassis during loading/unloading of the magnetic tape, and
   the guide rail comprises a stationary guide rail and a movable guide rail mounted on the main chassis and the sub chassis, respectively, to be inter-locked with each other by the movement of the sub chassis.

16. The magnetic tape loading device of claim 15, wherein the second protrusion protrudes from the lower surface of either the stationary guide rail or the movable guide rail, whichever is opposed to the upper surface of the link member when the loading of the magnetic tape is completed.

17. The magnetic tape loading device of claim 16, wherein the stationary guide rail is formed by bending a part of the main chassis.

18. A device for loading and unloading a tape cassette with magnetic tape from a tape recorder, comprising:
   a pole base assembly movable along a deck chassis to withdraw magnetic tape from a tape cassette during loading of the magnetic tape, the deck chassis comprising a main chassis and a sub chassis that slides along the main chassis during loading and unloading of the tape cassette;
   a guide rail mounted on the deck chassis to guide movement of the pole base assembly during loading and unloading of the maanetic tape, the guide rail comprising a stationary guide rail mounted on the main chassis and a movable guide rail mounted on the sub chassis, the stationary guide rail and movable guide rail having different thicknesses; and
   a movement prevention unit disposed on the deck chassis to prevent movement of the pole base assembly, the movement prevention unit comprising an extended portion formed by bending and extending a part of either the stationary guide rail or the movable guide rail, whichever is relatively thinner than the other, to a predetermined length to cause the connection part between the stationary guide rail and the movable guide rail to be level.

19. A device for loading and unloading a tape cassette according to claim 18, wherein
   a link member is connected to a side of the pole base assembly, the link member pressing the pole assembly during loading and unloading of the magnetic tape to cause the pole assembly to move and withdraw magnetic tape from the tape cassette during loading of the tape cassette; and
   the movement prevention unit comprises a leveling means for restraining a movement of the link member so that the link member can maintain a parallel relation with respect to a bottom surface of the guide rail during loading and unloading of the magnetic tape, and when the loading of the magnetic tape is completed.

* * * * *